US011984635B2

(12) United States Patent
Li et al.

(10) Patent No.: US 11,984,635 B2
(45) Date of Patent: May 14, 2024

(54) FILTER

(71) Applicants: PROSE TECHNOLOGIES (SUZHOU) CO., LTD., Suzhou (CN); PROSE TECHNOLOGIES LLC, Mount Olive, NJ (US)

(72) Inventors: Dunrong Li, Hwaseong (KR); Renhu Luo, Yongin (KR); Ze Yin, Suzhou (CN); Jian Lu, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 362 days.

(21) Appl. No.: 17/377,929

(22) Filed: Jul. 16, 2021

(65) Prior Publication Data

US 2021/0344093 A1 Nov. 4, 2021

Related U.S. Application Data

(63) Continuation of application No. PCT/CN2019/072152, filed on Jan. 17, 2019.

(51) Int. Cl.
*H01P 1/208* (2006.01)
*H01P 5/12* (2006.01)
*H01P 7/06* (2006.01)

(52) U.S. Cl.
CPC ................ *H01P 1/208* (2013.01); *H01P 5/12* (2013.01); *H01P 7/06* (2013.01)

(58) Field of Classification Search
None
See application file for complete search history.

(56) References Cited

U.S. PATENT DOCUMENTS 7,304,554 B2 12/2007 Obata
9,786,978 B2 * 10/2017 Zhang ................ H01P 1/20345
10,170,814 B2 * 1/2019 Peng ........................ H01P 3/08
(Continued)

FOREIGN PATENT DOCUMENTS

CN 101599569 A 12/2009
CN 201868548 U 6/2011
CN 107196023 A 9/2017
(Continued)

OTHER PUBLICATIONS

The World Intellectual Property Organization (WIPO) International Search Report With Translation and Written Opinion for PCT/CN2019/072152 dated Oct. 17, 2019 6 Pages (including translation).

*Primary Examiner* — Kenneth B Wells
(74) *Attorney, Agent, or Firm* — ANOVA LAW GROUP, PLLC

(57) ABSTRACT

A filter includes a filter frame and at least two resonators. A receiving space is formed in the filter frame. The at least two resonators are disposed in the receiving space and distributed along a signal transmission path. Adjacent resonators on the signal transmission path are coupled. Each resonator includes a body part and a bending part. One end of the body part is grounded. The bending part includes a head bending part and an end bending part, the head bending part being connected to the end bending part to form a resonator structure circulating in a counterclockwise or clockwise direction.

14 Claims, 6 Drawing Sheets

(56) References Cited

U.S. PATENT DOCUMENTS

| | | | | |
|---|---|---|---|---|
| 10,211,499 | B2 * | 2/2019 | Peng | H01P 3/023 |
| 2010/0117759 | A1 * | 5/2010 | Bourtoutian | H01P 1/20381<br>333/161 |

FOREIGN PATENT DOCUMENTS

| | | | |
|---|---|---|---|
| CN | 108232397 | A | 6/2018 |
| JP | 5341121 | B2 | 11/2013 |

* cited by examiner

FILTER

CROSS-REFERENCES TO RELATED APPLICATIONS

This application is a continuation application of PCT Patent Application No. PCT/CN2019/072152, filed on Jan. 17, 2019, the entire contents of which are incorporated herein by reference.

FIELD OF THE DISCLOSURE

The present disclosure relates to a filter, in particular to a compact filter.

BACKGROUND

With the rapid development of communication technology, the volume requirements of the filter are becoming more and more demanding. It is often necessary to design a resonator and a suppression zero in a limited small space to meet the in-hand and out-of-band insertion loss suppression requirements. However, it is difficult for the traditional filters to meet the design requirements of such a small volume.

For example, in the patent application with application number CN201710149229.5, a filter with a frame structure is disclosed. In this solution, the mouth-shape frame has an open structure on both sides, and the partition wall divides the inside of the frame into two spaces. There is an integrated resonator perpendicular to this partition wall. The resonator is bent into an L-shape or a T-shape to reduce the space requirement, but this form still has limitations on the miniaturization of the filter, and it is difficult to meet the design requirements of the small size of the filter.

In addition, the above-mentioned resonator is bent into an L-shaped or a T-shaped structure, which also has limitations on the coupling between the resonators. Specifically, in the two spaces divided by the partition wall, the signal path is transmitted in a U-shape. In order to realize cross-coupling in the U-shaped transmission path, a conductor needs to be added to two non-adjacent resonators. At this time, in order to realize the capacitive cross-coupling, the resonator and the conductor must be fixed in an open circuit, and for this purpose, the conductor is fixed in the insulator first, and then the accessory is fixed in the housing. If inductive cross-coupling is to be achieved, two non-adjacent resonators should be short-circuited to fix the conductors. At this time, the conductor is short-circuited and fixed on the resonator by welding, and the conductor used is bent to a specific size and then bonded to the resonator.

However, in order to form cross-coupling, the structure of adding sheet or wire conductors in the form of open circuit or short circuit between non-adjacent resonators requires fixing an insulator on the frame or welding conductors in the form of wires to the resonators. This type of structure incurs processing costs and processing tolerances, and when the resonator is directly welded or other forms of fixed chip conductors are used, the strength of cross coupling becomes very sensitive due to factors such as position tolerances and spacing. Therefore, the complexity of the process and the increase in sensitivity lead to an increase in production costs and a decrease in production capacity.

In addition, because it is necessary to ensure the transmission coupling between the resonators, the arrangement direction of the resonators is limited. Generally, the transmission path of the signal can only be in-line shaped or U-shaped, so the positions of the input and output ports are also not changeable, which makes it impossible to meet the diversity of system requirements, and in order to change the positions of the port, additional structural parts are also required.

SUMMARY

The purpose of the present disclosure is to overcome the defects of the prior art and provide a compact filter.

One aspect of the present disclosure provides a filter including a filter frame and at least two resonators. A receiving space is formed in the filter frame. The at least two resonators are disposed in the receiving space and distributed along a signal transmission path. Adjacent resonators on the signal transmission path are coupled. Bach resonator includes a body part and a bending part. One end of the body part is grounded. The bending part includes a head bending part and an end bending part, the head bending part being connected to the end bending part to form a resonator structure circulating in a counterclockwise or clockwise direction.

In some embodiments, the bending part further includes at least one middle bending part, and the at least one middle bending part connects the head bending part and the end bending part to form the resonator structure circulating in a counterclockwise or clockwise direction.

In some embodiments, the head bending part is formed by bending the other end of the body part in one direction or two directions.

In some embodiments, at least one partition wall is further disposed in the filter, and a coupling gap is formed between the partition wall and the inner wall of the filter frame.

In some embodiments, the partition wall is integrally formed with the inner wall of the filter frame.

In some embodiments, the body part of the resonator is integrally formed with the partition wall and grounded.

In some embodiments, the body part of the resonator is integrally formed with the inner wall of the filter frame and grounded.

In some embodiments, the signal transmission path in the filter has a U-shape or an S-shape according to the partition wall.

In some embodiments, one partition wall is disposed within the filter, and the partition wall is integrally formed with a middle section of the filter frame, and the signal transmission path in the filter has the U-shape according to the partition wall.

In some embodiments, a plurality of partition walls spaced with each other are disposed within the filter, and two adjacent partition walls respectively form a coupling gap with a corresponding inner wall of two opposite inner walls of the filter frame, the signal transmission path in the filter has an S-shape according to the partition wall.

In some embodiments, the partition wall divides the receiving space into a plurality of receiving chambers, and the partition wall is provided with a coupling opening, and two adjacent resonators in different receiving chambers are coupled through the coupling opening to form a cross-coupling.

In some embodiments, the body parts of two adjacent resonators in different receiving chambers are directly connected through the coupling opening to form inductive cross-coupling.

In some embodiments, the bending parts of two adjacent resonators in different receiving chambers are spaced apart a distance through the coupling opening to form capacitive cross-coupling.

In some embodiments, the filter further comprises an upper cover plate arranged at the upper end of the filter frame and a lower cover plate arranged at the lower end of the filter frame, the upper and lower covers encapsulate the receiving space, and the thickness of the bending petit of the resonator is greater than the thickness of the body part in a direction perpendicular to the upper and lower cover plate.

In some embodiments, the filter further includes a signal input port and a signal output port which are arranged outside the filter frame and communicate with the receiving space, and the signal input port and the signal output port are respectively located in the two ends of the signal transmission path.

In some embodiments, the upper and lower cover plates are respectively fixed by screw or assembled on the upper and lower ends of the filter frame by soldering or laser welding.

The beneficial effects of the present disclosure are:

1. The filter frame is provided with an integrally formed resonator with multiple bends (at least two bending parts), which has a significant effect on the miniaturization of the filter, and the resonator and the filter frame are an integrated structure, which reduces the cost of assembly man-hours, reduces cumulative tolerances and assembly tolerances, and reduces contact loss. At the same time, the filter has a better PIM (Passive Inter-Modulation) performance.
2. The shape of each resonator can be changed and designed as needed, and the coupling mode between the resonators can be freely designed according to the shape of the resonator; in addition, the signal transmission path can be freely changed in combination with the partition walls, in turn, the design position of the signal input/output port can be freely selected, which improves the overall design flexibility of the filter.
3. The opening of the partition wall can be used to realize cross-coupling between non-adjacent resonators without adding structural parts. Therefore, the processing and assembly tolerances caused by the structural parts can be reduced, and the processing difficulty of the product can be reduced, and the processing and Assembly costs can also be greatly reduced.

REFERENCE NUMERALS

1 filter frame, 11 receiving space, 111 receiving chamber, 2/21~26 resonator, 211 body part, 212 head bending part, 213 end bending part, 214 middle bending part, 3 upper cover, 4 adjustable structure, 5 partition wall, 51 coupling opening, 6 coupling gap, 7 signal input port, 8 signal output port.

DETAILED DESCRIPTION

The technical solutions of the embodiments of the present disclosure will be clearly and completely described below in conjunction with the accompanying drawings of the present disclosure.

In the filter disclosed in the present disclosure, an integrally formed resonator with multiple bending structures is arranged in the filter frame, so that the size of the filter is smaller, and the coupling mode between the resonators and the signal are also realized. The diversification of the design of transmission paths and signal port positions improves the flexibility of filter design; and the cross-coupling between non-adjacent resonators is realized through the opening on the partition wall, which simplifies the structure and processing procedures of the filter.

Figure 1:
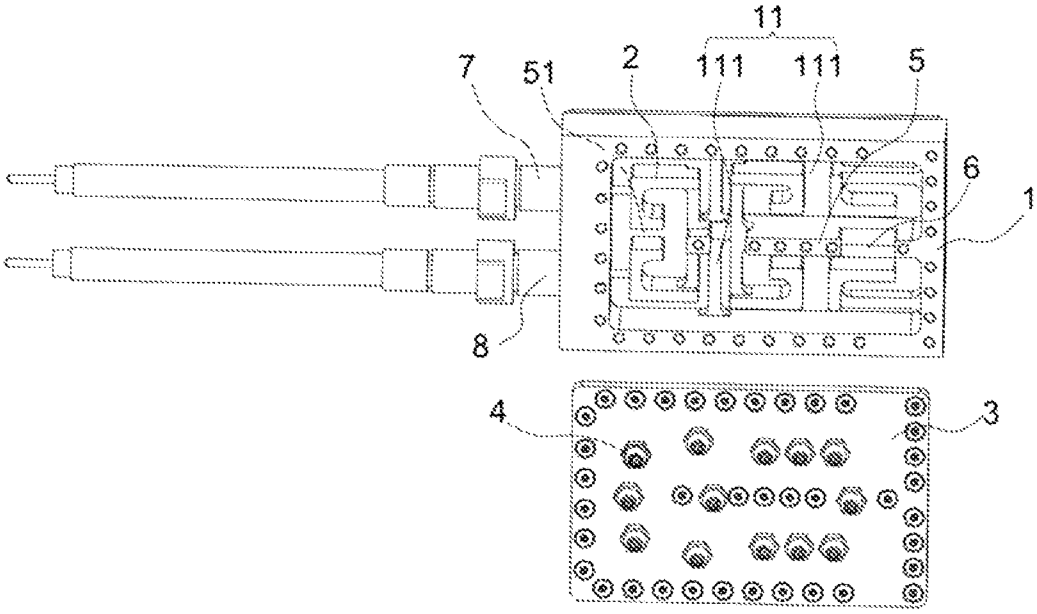
FIG. 1 is a perspective view showing the structure of an example filter according to embodiment 1 of the present disclosure.
Figure 2:
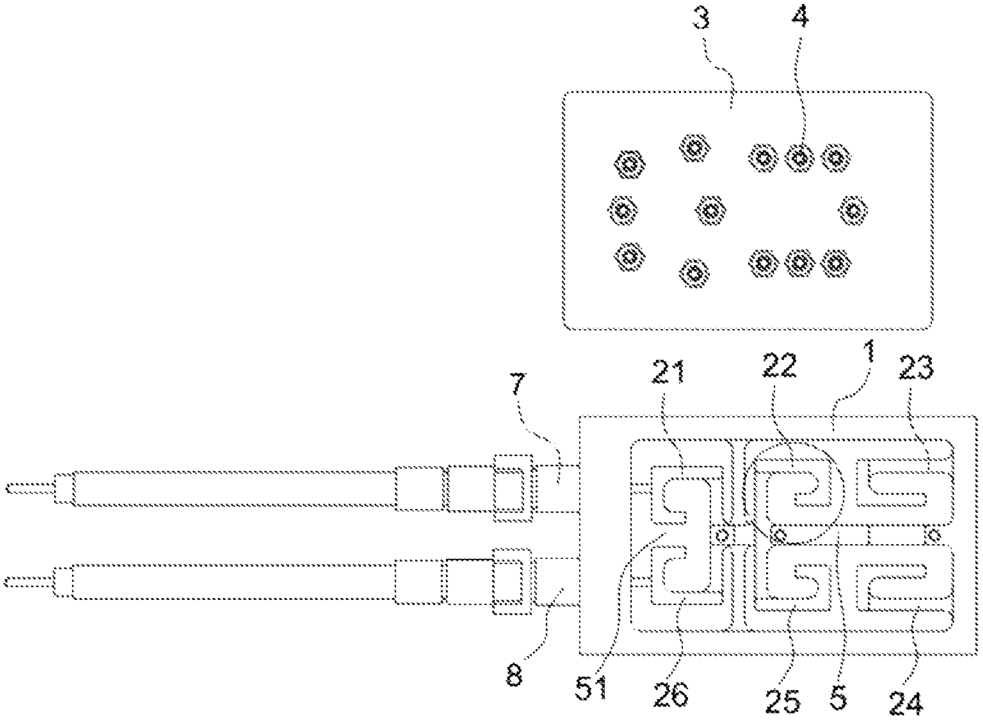
FIG. 2 is a schematic top view of the structure of the example filter according to embodiment 1 of the present disclosure.
Figure 3:
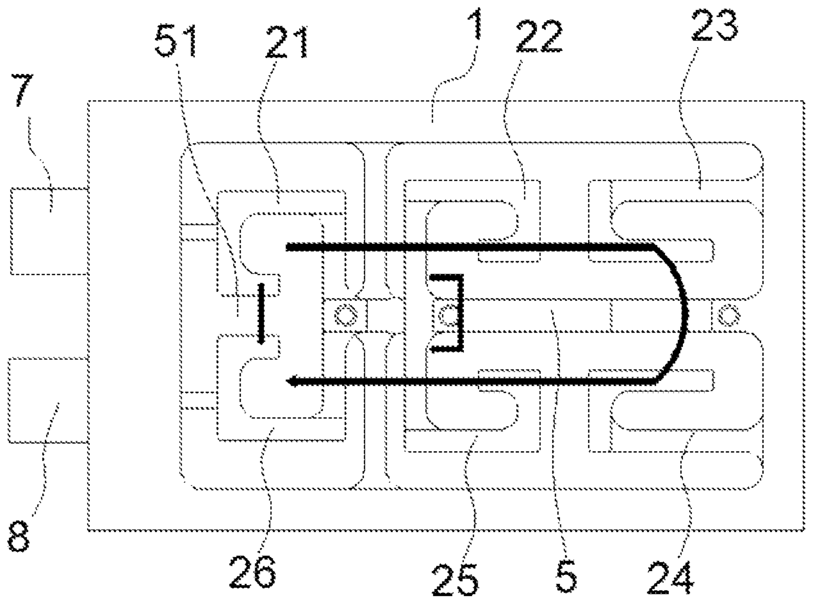
FIG. 3 is a schematic diagram indicating a signal transmission path of the example filter according to embodiment 1 of the present disclosure.

With reference to FIGS. 1 to 3, a filter disclosed in the present disclosure includes a filter frame 1 and at least two resonators 2, wherein the upper and lower ends of the filter frame 1 are open. It can be understood that, in some other embodiments, only the upper end of the filter frame 1 is open. A hollow receiving space 11 for the resonator is formed within the filter frame 1, and the upper and lower openings of the filter frame 1 can be adopted by the upper cover 3 and the lower cover (not shown) respectively, so that a sealed receiving space 11 is formed therein; when only the upper end is open, only the upper cover 3 is required to encapsulate it. In implementation, the upper and lower cover plates can be fixed by screws or assembled by soldering or laser welding. In addition, an adjustable structure 4 for adjusting the frequency and/or coupling amount can be added to the upper cover 3. When implemented, the adjustable structure 4 may include the cooperation of a screw and a nut, or other forms that extend into the conductor through the cover surface are utilized. And the upper and lower cover plates can also be replaced by PCB boards.

A plurality of resonators 2 are arranged in the receiving space 11 and may be integrally formed with the filter frame 1. The resonator 2 can form a variety of signal transmission paths in the receiving space 11, such as in-line shaped, U-shaped or S-shaped. For example, when an in-line shaped signal transmission path is formed, a plurality of resonators 2 are distributed in the same row in the receiving space 11, and are distributed from one side wall of the filter frame 1 to the opposite side wall of the filter frame 1, forming a signal transmission path (that is, in-line shape), and the plane where the resonator 2 is located is parallel or approximately parallel to the upper and lower surfaces of the filter frame 1, that is, it is arranged laterally in the filter frame 1.

As an alternative, at least one partition wall 5 integrally formed with the filter frame 1 may be provided in the filter frame 1. As shown in FIGS. 1 to 3, the partition wall 5 divides the receiving space 11 into a plurality of receiving chambers 111. Each receiving chamber 111 is provided with at least two resonators 2, and the distribution of the resonators 2 in each receiving chamber 111 is the same as or similar to the above-mentioned in-line distribution of the resonators 2, the above description can be referred to, and won't be repeated here. In this way, the signal transmission path formed by the filters 2 in the plurality of receiving chambers 111 may be U-shaped or S-shaped or other shapes.

The partition wall 5 is arranged between two adjacent receiving chambers 111 to isolate the resonators 2 of different receiving chambers 111. The partition wall 5 is integrally formed with the filter frame 1. In this embodiment 1, the partition wall 5 is located in the filter frame 1, and divides the receiving space 11 into two receiving chambers 111, and each receiving chamber 111 is provided with multiple receiving chambers 111. Each receiving chamber 111 is provided with multiple resonators 2 (as shown in FIG. 2 and FIG. 3, resonators 21-22 are arranged in the upper receiving chamber, and resonators 24-26 are arranged in the lower receiving chamber). The partition wall 5 is not in contact with the right side wall of the filter frame 1, and a coupling gap 6 is formed therebetween, as shown in FIG. 1, the coupling gap 6 enabling two adjacent resonators (i.e., resonators 23 and 24) located in different receiving chambers to be coupled. The partition wall 5 forms a signal transmission path between the resonators 21 to 26. As in the embodiment 1, the signal transmission path is U-shaped. In other words, the signal transmission path can be freely designed according to the installation position and the installation number of the partition wall 5, etc.

Figure 4:
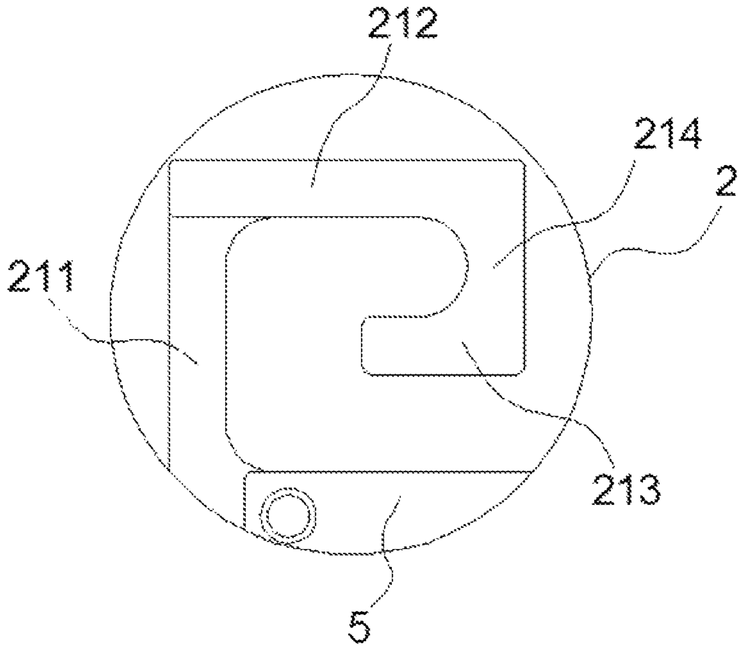
FIG. 4 is a schematic diagram of a structure of an example resonator according to some embodiments of the present disclosure.

As shown in FIG. 4, each resonator 2 specifically includes a body part 211 and a bending part. One end of the body part 211 is grounded. When the partition wall 5 is not disposed in the filter frame 1, the grounding terminal can be integrally formed with any side wall of the filter frame 1, such as integrally formed with the rear side wall of the filter frame 1, and the other end extends to the front side wall close to the filter frame 1, and tor example, can be integrally formed with the left side of the filter frame 1, and the other end extends to the right side wall close to the filter frame 1. When the partition wall 5 is provided, the grounding terminal can be integrally formed with the partition wall 5, and/or integrally formed with any side wall of the filter frame 1 as required. As shown in FIGS. 1 to 3, in this embodiment 1, the grounding terminals of the resonators 21, 22, 25, and 26 are integrally formed with the partition wall 5, while the grounding terminals of the resonators 23 and 24 are integrally formed with the right side wall of the filter frame 1. In other words, the design of the grounding terminal of the body part 211 can be freely changed between up, down, left and right in the filter frame 1.

The bending part is connected to the other end of the body part 211 and formed by bending. The bending shape of the bending part can be freely changed and designed according to actual needs. There is no restriction here, which means that the shape of the resonator 2 can be bent to form various designs as required. Specifically, as shown in FIG. 4, the bending part includes a head bending part 212 and an end bending part 213, wherein the head bending part 212 is formed by bending the other end of the body part 211 in one or two directions. The head bending part 212 and the end bending part 213 are connected to form a resonator structure circulating in a counterclockwise or clockwise direction. Alternatively, the bending part may include at least one middle bending part 214 in addition to the head bending part 212 and the end bending part 213, wherein the head bending part 212 is formed by bending the other end of the main body 211 in one direction or two directions, and the middle bending part 214 connects the head bending part 212 and the end bending part 213 to form a resonator structure circulating in a counterclockwise or clockwise direction.

As shown in FIG. 4, in the embodiment 1, the bending part is connected to the other end of the body part 211 to form at least three bends by perpendicular bending in a clockwise or counterclockwise direction, that is, the bending part includes the head bending part 212, middle bending part 214 and end bending part 213, wherein the head bending part 212 is connected to the other end of the body part 211 to form a perpendicular bend, and the middle bending part is connected to the end of the head bending part 212, a perpendicular bend is formed, and the end bending part 213 is connected to the end of the middle bending part 214 to form a perpendicular bend. Compared with the existing L-shaped and T-shaped resonators, the resonator structure designed in the present disclosure can realize smaller size of the filter, and lower frequency of the filter as well. In some embodiments, the bending part is made thicker in the direction perpendicular to the upper and lower ends of the filter frame, and even if the thickness of the bending part is greater than the thickness of the body part 211, the volume of the resonator can be further reduced under the requirement of the same frequency.

The electromagnetic hybrid coupling is present between two adjacent resonators 2 on the signal transmission path. The specific main coupling method is determined by the shape and arrangement of the resonators 2. The coupling degree between the resonators 2 can be adjusted by coupling area and spacing between the resonators 2. It should be noted that the coupling of a general TEM mode filter is the coexistence of electrical coupling (namely capacitive coupling) and magnetic coupling (namely inductive coupling). Among the two couplings, the larger coupling is called dominant coupling, and the dominant coupling mode in the filter of the present disclosure can be freely selected by the shape of the resonator 2. Like the integrated 6-order filter in the embodiment 1, the signal transmission path formed is a U-shaped path formed by the resonators 21 to 26.

Figure 5:
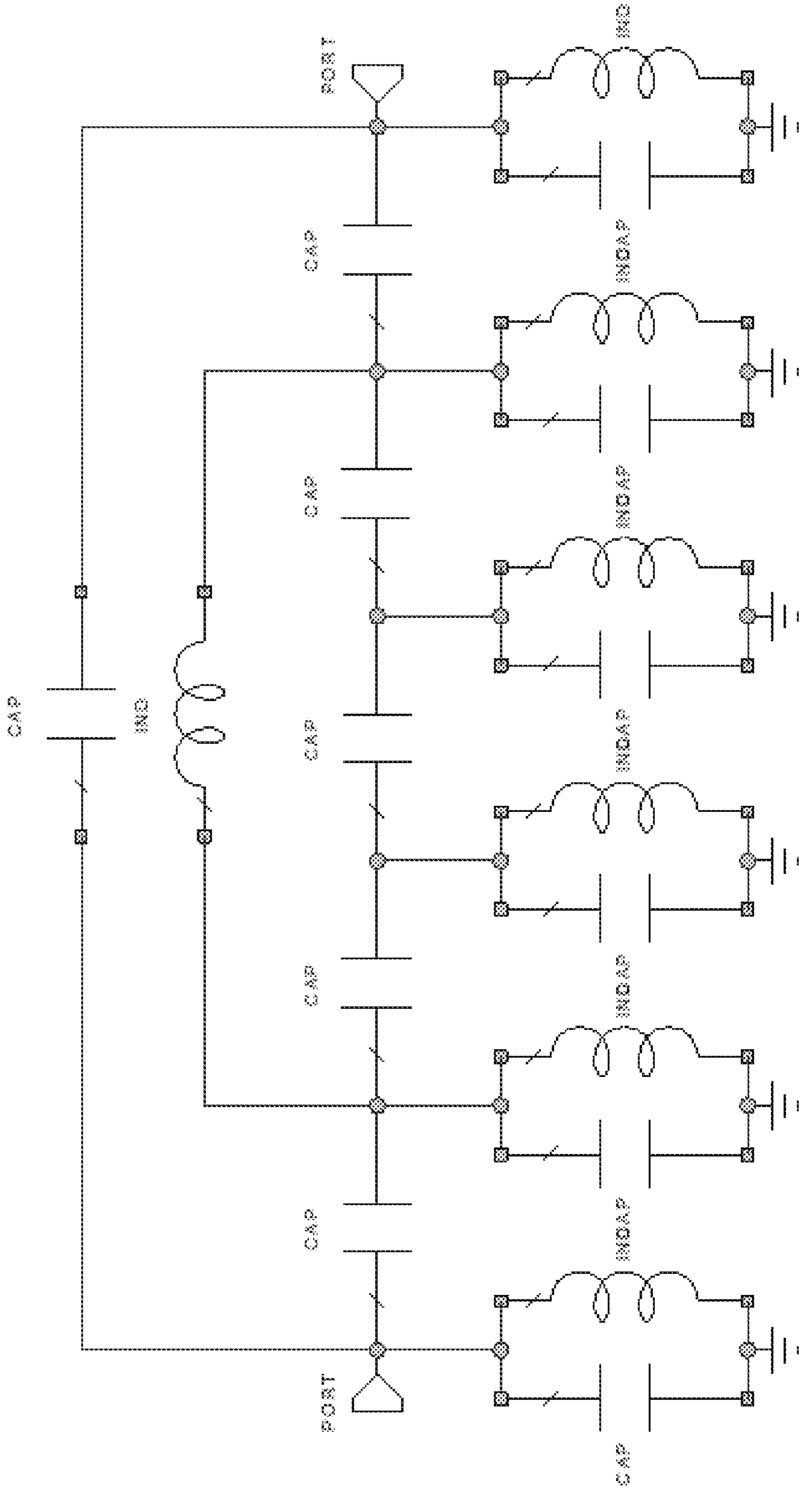
FIG. 5 is a schematic diagram of an equivalent circuit of the example filter according to embodiment 1 of the present disclosure.
Figure 6:
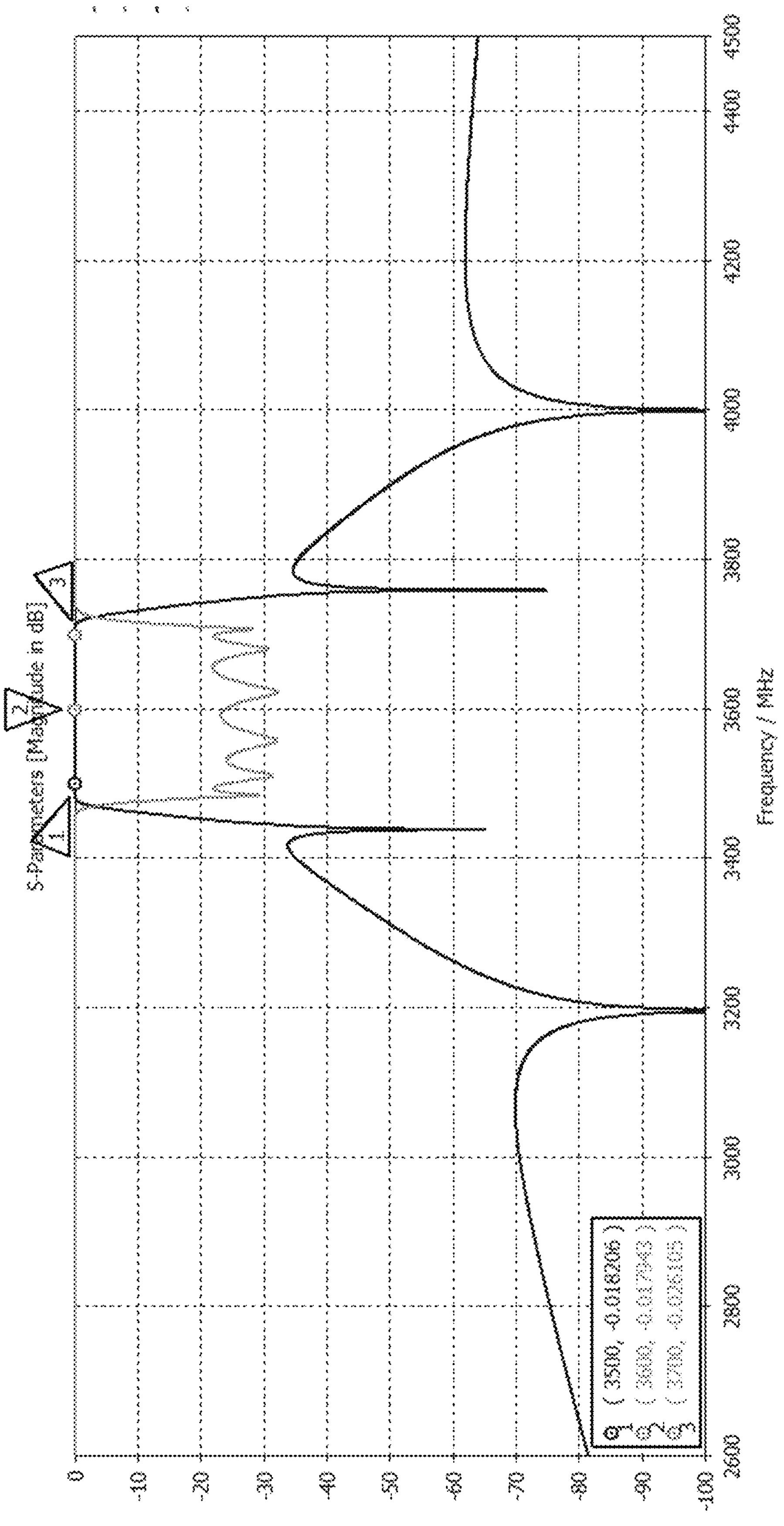
FIG. 6 is a schematic diagram of a corresponding electrical performance curve of the example filter according to embodiment 1 of the present disclosure.

In some embodiments, at least one pair of adjacent resonators in the plurality of pairs of adjacent resonators in different receiving chambers is coupled to each other to realize cross-coupling. As shown in FIGS. 1 to 3, two adjacent resonators in different receiving chambers form a cross-coupled transmission path through the corresponding coupling opening 51 on the partition wall 5. The coupling degree of the cross-coupling is adjusted according to the area of the coupling opening 51, and/or the shape and coupling distance of the resonator coupled through the coupling opening 51, and the coupling mode selection of the cross-coupling is determined according to the dominant coupling mode. In the embodiment 1, a coupling opening 51 is provided on the partition wall 5 at a position corresponding to the resonators 22 and 25, and the resonator 22 and the body part 211 of the resonator 25 are directly connected together through the coupling opening 51 to realize inductive cross-coupling, namely adding the inductive cross-coupling to form two transmission zero points; and a coupling opening 51 is also provided on the partition wall 5 at a position corresponding to the resonators 21 and 26, so that the bent portions of the resonators 21 and 26 are separated by a certain distance. The opening 51 forms capacitive coupling, that is, capacitive cross-coupling is added. In this embodiment, a cross-coupling is used in a higher frequency band of a pass band, and two zero with opposite phases are generated in the low frequency range. Therefore, the two cross-couplings produce a total of 4 transmissions zero points. As shown in FIG. 5, the cross-coupling between the resonators 22 and 25 is inductive coupling, and the cross-coupling between the resonators 21 and 26 is capacitive coupling. FIG. 6 shows the corresponding electrical performance curve. The inductive cross-coupling and capacitive cross-coupling formed by the two coupling openings 51 form a total of 4 zero points, thus a high-performance filter with good attenuation characteristics can be realized. The strength and position of each zero point can be controlled independently.

Further, as shown in FIGS. 1 to 3, the filter further includes a signal input port 7 and a signal output port 8. The two ports 7, 8 are respectively arranged at the two ends of the signal transmission path, the positions of the output ports 7, 8 are determined according to the direction of the signal transmission path, that is to say, due to the different signal transmission paths, the setting positions can be different and thus changing the signal transmission path can alter the signal input and output ports 7, 8. As can be seen from the above description, the signal transmission path can be freely designed by the installation position of the partition wall 5. In Embodiment 1, the signal input port 7 is arranged outside the filter frame 1 at a position close to the resonator 21, and the signal output port 8 is arranged outside the filter frame 1 at a position close to the resonator 26. During implementation, the signal input port 7 and the signal output port 8 can also have various forms. In this embodiment, the signal input and output ports 7 and 8 are in the form of inner cores, which can also be changed into connectors, or the upper and lower ends combined with PCB boards (i.e., the upper cover and the lower cover) form the signal input and output ports 7, 8.

Figure 7:
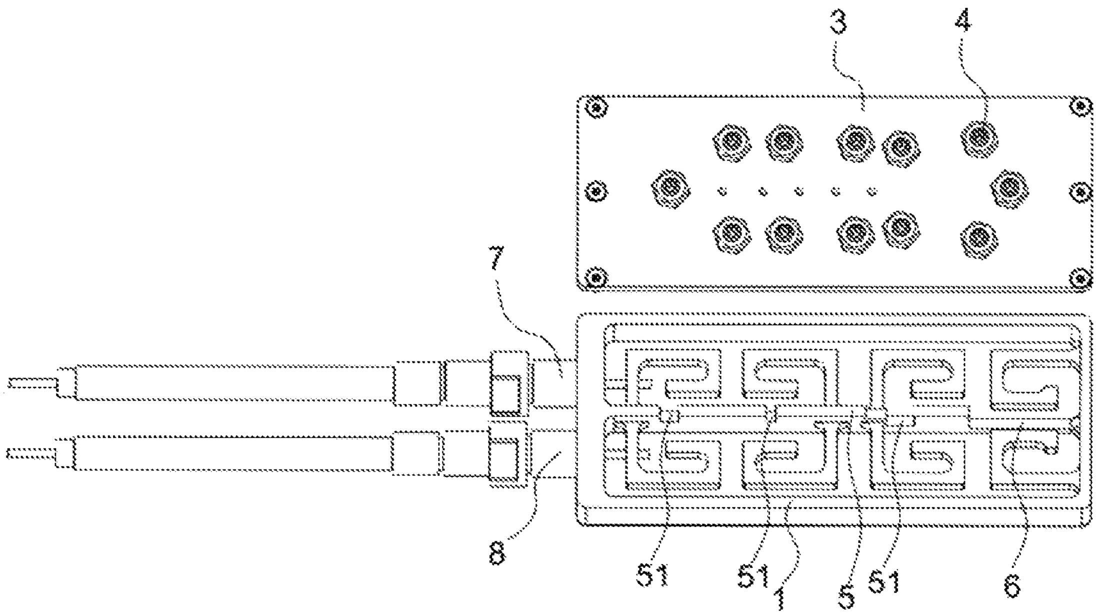
FIG. 7 is a perspective view showing structure of an example filter according to embodiment 2 of the present disclosure.

As shown in FIG. 7, there are 8 integrated resonators 2 in a filter frame 1 to form a 4-cavity band-pass filter, wherein the filter frame 1 is provided with three partition walls 5 distributed in the same row (for example, distributed along the left side wall of the filter frame 1 to the right side wall of the filter frame 1), and the three partition walls 5 divide receiving space 11 into four receiving chambers 111, and each receiving chamber 111 is provided with two resonators 2. The shape and grounding position of the resonators 2 refer to the description of the above-mentioned embodiment 1, which will not be repeated here. Whether the dominant coupling mode between the resonators 2 in embodiment 2 is the electrical coupling mode or the magnetic coupling mode is controlled according to the shape of the resonators 2 and the position of mutual coupling.

Figure 8:
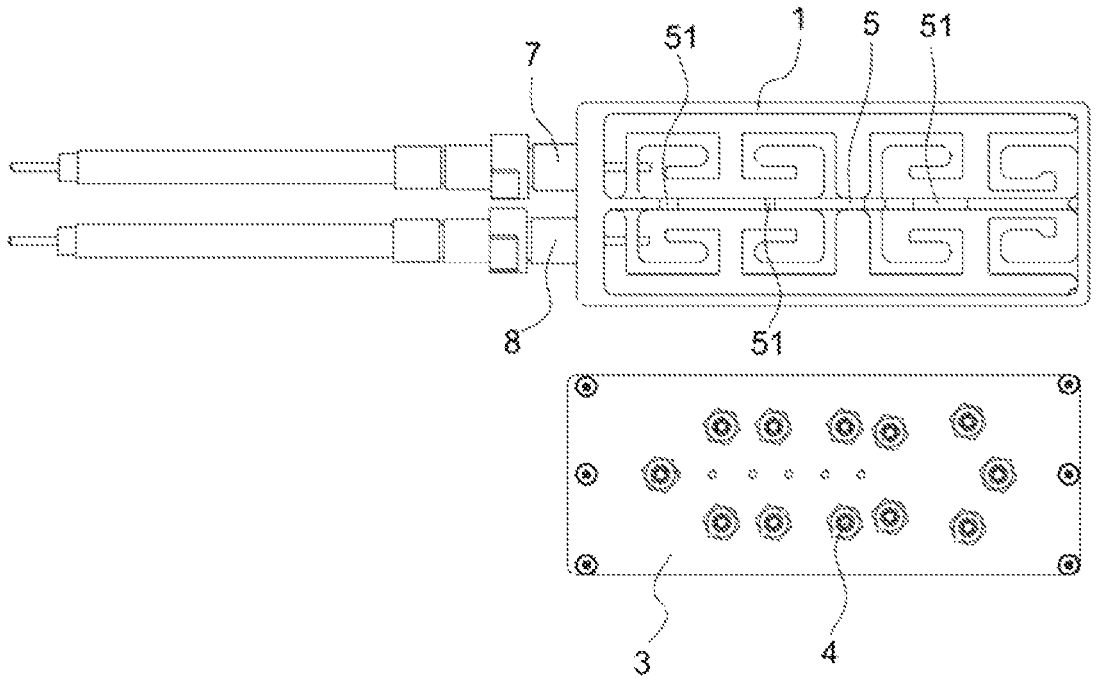
FIG. 8 is a perspective view showing structure of an example filter according to embodiment 3 of the present disclosure.
Figure 9:
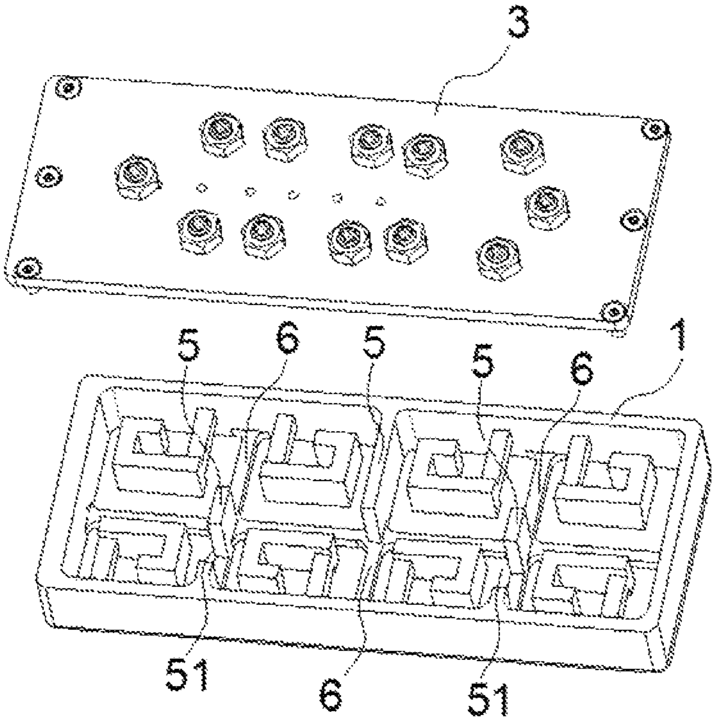
FIG. 9 is a schematic top view of the structure of the example filter according to embodiment 3 of the present disclosure.

The two coupling gaps 6 of two adjacent partition walls 5 are located on different sides, so that the signal transmission path in the filter 2 is transmitted in an S-shape according to the partition wall 5. According to the S-shaped signal transmission path, the positions of the signal input and output ports 7 and 8 can be controlled. The signal input and output ports 7 and 8 are respectively at the two ends of the signal transmission path, and the direction of the signal transmission path determines the positions of the signal input and output ports 7, 8. In some embodiments, the signal transmission path of the resonator in Embodiment 2 can also be U-shaped. As shown in FIGS. 8 and 9, a partition wall 5 is provided in the intermediate of the filter frame 1.

That is to say, the shape and grounding position of the resonator 2 of the present disclosure can adopt any suitable arrangement and the dominant coupling mode between the resonators 2 can be determined by the coupling position of the coupled resonators 2, so it can also adopt any suitable arrangement. In addition, the installation position of the partition wall 5 can adopt any suitable arrangement. The signal transmission path is determined by the installation position of the partition wall 5, so it can also adopt any suitable arrangement. Further, the signal input and output ports 7 and 8 are determined by the signal transmission path, so they can also adopt any suitable arrangement. Further, the cross-coupling between the resonators 2 is determined according to the performance requirements of the filter, so it can also adopt any suitable arrangement. In the present disclosure, the shape of the resonator 2, the coupling mode between the resonators 2, the signal transmission path, the signal input and output ports 7, 8, and the filter cross-coupling mode can be adjusted according to practical application scenarios, and are not limited to the three implementations described above.

It can be seen from FIGS. 1, 7 and 8 that the present disclosure has no additional assembly structure except tor the joint, and the processing and assembly costs can be greatly reduced. And there are no additional structural parts when cross-coupling between non-adjacent resonators is formed. Cross-coupling can be realized only by opening the partition wall, so the processing and assembly tolerances caused by the structural parts can be reduced, and the difficulty of producing products can be reduced.

Further, two or more components of the disclosed filter can be integrally formed. In some embodiments, the body part(s) of one or more resonators 2 can be integrally formed with the filter frame 1, and one or more partition walls 5 can be separately formed and installed to the filter frame 1. In some other embodiments, the body part(s) of one or more resonators 2 can be integrally formed with one or more partition walls 5, and then be installed to a separately formed filter frame 1. In some other embodiments, the body part(s) of one or more resonators 2, one or more partition walls 5 and the filter frame 1 can be integrally formed.

The technical content and technical features of the present disclosure have been disclosed above, but those skilled in the art may still make various substitutions and modifications based on the teachings and disclosures of the present disclosure without departing from the spirit of the present disclosure. Therefore, the scope of protection of the present disclosure should not be limited to the disclosure in the embodiments, but should include various substitutions and modifications that do not deviate from the present disclosure, and are covered by the claims of this patent application.

What is claimed is:

1. A filter, comprising:

a filter frame in which a receiving space is formed;

at least two resonators disposed in the receiving space and distributed along a signal transmission path, adjacent resonators on the signal transmission path being coupled to each other, and each resonator including a body part and a bending part, wherein:

one end of the body part is grounded, the bending part includes a head bending part and an end bending part, the head bending part being connected to the end bending part to form a resonator structure circulating in a counterclockwise or clockwise direction.

2. The filter according to claim 1, wherein the bending part further includes at least one middle bending part, and the at least one middle bending part connects the head bending part and the end bending part to form the resonator structure circulating in the counterclockwise or clockwise direction.

3. The filter according to claim 1, wherein the head bending part is formed by bending another end of the body part in one direction or two directions.

4. The filter according to claim 1, further comprising:

at least one partition wall disposed in the filter, a coupling gap being formed between the partition wall and an inner wall of the filter frame.

5. The filter according to claim 4, wherein the signal transmission path in the filter has a U-shape or an S-shape.

6. The filter according to claim 5, wherein the partition wall is integrally formed with a middle section of the filter frame, and the signal transmission path in the filter has the U-shape.

7. The fitter according to claim 4, wherein a plurality of partition walls spaced with each other are disposed within the filter, and two adjacent partition walls respectively form a coupling gap with a corresponding inner wall of two opposite inner walls of the filter frame, and the signal transmission path in the filter has an S-shape according to the partition wall.

8. The filter according to claim 4, wherein the partition wall divides the receiving space into a plurality of receiving chambers, the partition wall is provided with a coupling opening, and two adjacent resonators in different receiving chambers are coupled to each other through the coupling opening to form a cross-coupling.

9. The filter according to claim 8, wherein the body parts of two adjacent resonators in different receiving chambers are directly connected through the coupling opening to form inductive cross-coupling.

10. The filter according to claim 8, wherein the bending parts of two adjacent resonators in different receiving chambers are spaced apart through the coupling opening to form capacitive cross-coupling.

11. The filter according to claim 1, wherein the filter further comprises an upper cover plate arranged at an upper end of the filter frame and a lower cover plate arranged at a lower end of the filter frame, the upper cover and the lower cover encapsulate the receiving space, and a thickness of the bending part of one or both of the at least two resonators is greater than a thickness of the body part in a direction perpendicular to the upper and lower cover plates.

12. The filter according to claim 4, wherein: the partition wall is integrally formed with the inner wall of the filter frame.

13. The filter according to claim 12, wherein: the body part of the resonator is integrally formed with the partition wall and grounded.

14. The filter according to claim 12, wherein: the body part of the resonator is integrally formed with the inner wall of the filter frame and grounded.

* * * * *